(12) United States Patent
Perner et al.

(10) Patent No.: US 7,248,306 B2
(45) Date of Patent: Jul. 24, 2007

(54) METHOD OF MAKING ACTIVE MATRIX DISPLAY

(75) Inventors: Frederick A. Perner, Santa Barbara, CA (US); Krzysztof Nauka, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 51 days.

(21) Appl. No.: 10/897,533

(22) Filed: Jul. 23, 2004

(65) Prior Publication Data
US 2006/0017875 A1    Jan. 26, 2006

(51) Int. Cl.
*G02F 1/136* (2006.01)
(52) U.S. Cl. .......................... 349/43; 349/46
(58) Field of Classification Search ............ 349/42–43, 349/187, 45–46; 257/59, 72
See application file for complete search history.

(56) References Cited

U.S. PATENT DOCUMENTS

| | | | |
|---|---|---|---|
| 4,108,521 A | 8/1978 | Wicher, Jr. | |
| 4,305,204 A | 12/1981 | Toggart et al. | |
| 4,395,244 A | 7/1983 | Glaser | |
| 4,464,135 A | 8/1984 | Andreadakis | |
| 5,633,738 A * | 5/1997 | Wakui et al. | 349/46 |
| 5,739,877 A * | 4/1998 | Onisawa et al. | 349/42 |
| 6,300,988 B1 * | 10/2001 | Ishihara et al. | 349/43 |
| 6,603,710 B1 | 8/2003 | Pantet et al. | |
| 2002/0033907 A1 * | 3/2002 | Oke et al. | 349/46 |

FOREIGN PATENT DOCUMENTS

JP    02-285326    * 11/1990

* cited by examiner

*Primary Examiner*—Toan Ton (57) ABSTRACT

A method of making a lower cost active matrix display. In a particular embodiment, the method includes providing at least one first conductor upon a substrate and depositing a gate dielectric upon the first conductor and substrate. At least one paired second conductor and a pixel electrode are deposited upon the gate dielectric, with the second conductor crossing the first conductor and with a narrow gap between the paired second conductor and the pixel electrode. A semiconductor material is deposited over the paired second conductor and pixel electrode, filling the narrow gap. The narrow gap shelters a portion of the semiconductor material, which serves as a semiconductor bridge capable of functioning either as an insulator or as a channel region of a field effect transistor. The remaining, unsheltered semiconductor material is removed. A liquid crystal layer is then deposited upon the paired second conductor, the pixel electrode and the sheltered semiconductor material, and a translucent conductor is deposited upon the liquid crystal display layer. An associated display is also provided.

34 Claims, 7 Drawing Sheets

METHOD OF MAKING ACTIVE MATRIX DISPLAY

FIELD OF THE INVENTION

The present invention relates generally to displays, and in particular to an improved method of making a low cost active matrix display.

BACKGROUND

Socially and professionally, most people rely upon video displays in one form or another for at least a portion of their work and/or recreation. Cathode ray tubes (CRTs) larger and heavier than comparable displays composed of liquid crystal devices (LCDs) or light-emitting diodes (LEDs), which can provide a visual image of comparable resolution without the traditional bulk and weight associated with CRTs.

More specifically, as they typically do not include a tube, an LCD or LED display may be quite thin and light weight, improving portability of laptop computers, video displays in vehicles and airplanes, and information displays that are mounted or set in eye catching locations.

A typical CRT display also requires more power to operate then does a comparably sized LED display. For example a 14" CRT display may require 110 watts of power, whereas a 14" LED display may require 30~40 watts or less. This difference in power consumption may be significant in the field of portable devices that must operate from a battery. In addition, power conservation and low profile aspects are increasingly in demand for home and office products, where the savings in energy may total several hundred dollars per year.

A CRT operates by a scanning electron beam used to excite phosphorous-based materials on the back side of the screen. The intensity of each pixel may be associated with the intensity of the electron beam. With an LCD display, each pixel is a transient light emitting device that may be selectively adjusted to permit light to shine through the pixel.

Figure 1:
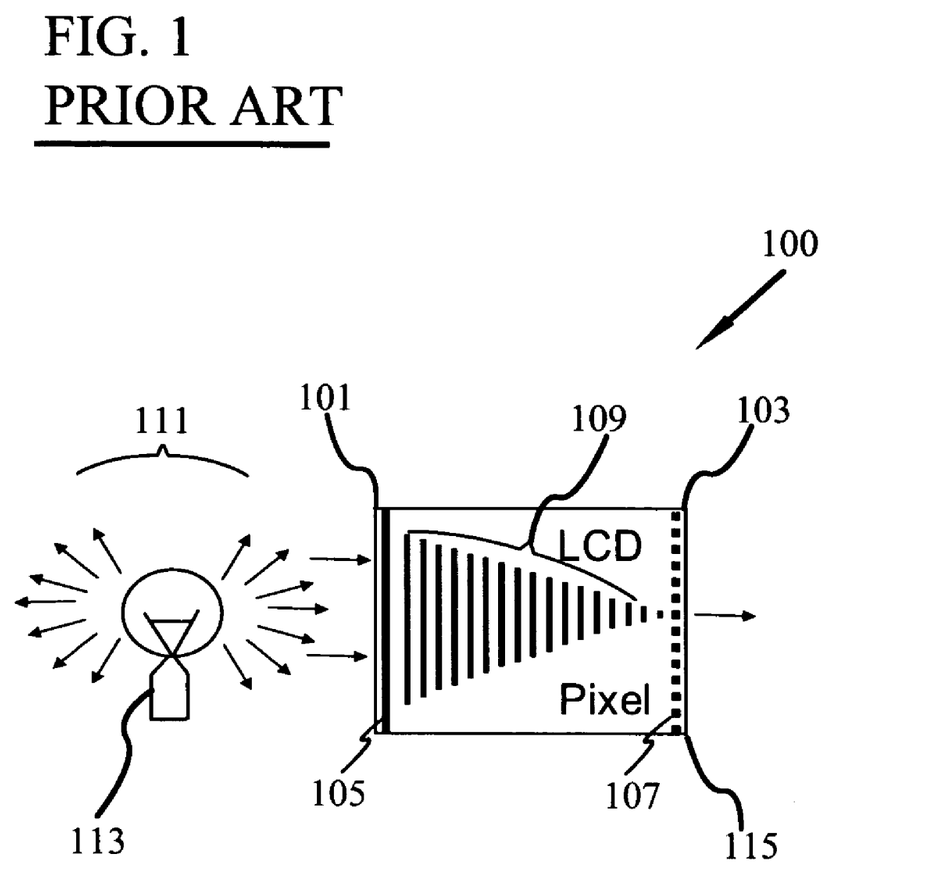
FIG. 1 is a prior art illustration of a liquid crystal display.

Generally speaking, to create an LCD 100, as shown in FIG. 1, a first and second polarized glass plate 101, 103 are provided, each having microscopic grooves in the surface opposite from, but in line with, a polarizing film 105, 107. The first and second polarized glass plates 101, 103 are parallel to one another with the respective polarizing film of each transverse to the other. For illustrative purposes, the polarizing film 105 and grooves of first glass plate 101 run parallel to the page, such that they are represented as solid line. In contrast, the polarizing film 107 and grooves of second glass plate 103 are perpendicular to the page, such that they are represented as parallel cross sections.

Nematic liquid crystals 109 are then added between the first and second glass plates 101, 103. The grooves will cause the layer of molecules of liquid crystals 109 that are in contact with the grooved glass plates 101, 103 to align with the grooves. As the grooves of one glass plate 101 are transverse to the grooves of the other glass plate 103, the Nematic liquid crystal 109 will twist. In the 2-D illustration of FIG. 1 this twisting is represented as nematic liquid crystal 109 appearing to change in size as it progresses from glass plate 101 to glass plate 103.

As light 111 provided by light source 113 strikes first glass plate 101, it is polarized. The molecules in each layer of nematic liquid crystal 109 then guide the light 111 from layer to layer within nematic liquid crystal 109, and in so doing, twist the light 111 to align with the grooves and the polarized filter of the second glass plate 103.

If an electric charge is applied across nematic liquid crystal 109, the molecules of nematic liquid crystal 109 will untwist. As nematic liquid crystal 109 straightens out, the angle of the light 111 passing through from first glass plate 101 to second glass plate 103 also changes, and the cross polarization orientation between the first and second polarized plates 105, 107 blocks the passage of light 111. In an alternative configuration, glass plate 103 may be optionally replaced with a reflective surface, such as a mirror 115, or a mirrored surface. When the nematic liquid crystal 109 is properly aligned by a field, light 111 will enter the first glass plate 101 and be reflected off mirror 115 and back out through first glass plate 101. By changing the applied field and thus the twist in nematic liquid crystal 109, the amount of light reflected may be reduced and/or blocked entirely.

By varying the degree of twisting, the LCD 100 utilizing nematic liquid crystal 109 can control how much of light 111 passes through, thus providing a gray scale. When the external light 111 is colored, or the light 111 passes through a color filter before or after passing through the LCD 100, color images of varying intensity may also be provided.

Generally speaking, the cost of manufacturing an LCD display rapidly increases as the area of the display is increased. Nevertheless, consumer demand emphasizes ever-increasing display size and resolution. Typical manufacturing processes employed to provide the LCD components include photolithographic techniques and other semiconductor fabrication techniques suited to the fabrication of small-scale components established on wafer substrates, which may be only a few centimeters in diameter. Even with such small substrates, it is not uncommon to move, align and repeat the masking/structure defining process.

As a common LCD display for a laptop computer may have approximately a 12" viewing area and a large screen display may be multiple times larger, the re-alignment tolerances of photolithographic processes permit the introduction of defects that may render the entire display unusable. As such, quality control measures discard a high percentage of displays before they are fully assembled. As such, displays, especially large displays, are generally more expensive than they might be if not for the manufacturer's need to recoup the costs for resources, time, precision tooling, and device failure rate.

Hence, there is a need for a process to provide a low cost active matrix display that overcomes one or more of the drawbacks identified above. The present invention satisfies one or more of these needs.

SUMMARY

The present disclosure advances the art by providing a method of making an active matrix display.

In particular and by way of example only, according to an embodiment of the present invention, a method of making an active matrix display is provided, including: providing at least one first conductor upon a substrate; depositing a gate dielectric upon the first conductor; providing at least one paired second conductor and a pixel electrode upon the gate dielectric, a narrow gap being established between the second conductor and the pixel electrode; depositing a semiconductor material over the at least one paired second conductor and pixel electrode and within the narrow gap, the narrow gap sheltering at least a portion of the semiconductor material to provide sheltered semiconductor material; removing unsheltered semiconductor material; depositing a liquid crystal display layer upon the paired second conductor, pixel electrode and the sheltered semiconductor material, and depositing a translucent conductor upon the liquid crystal display layer.

DETAILED DESCRIPTION

Before proceeding with the detailed description, it is to be appreciated that the present teaching is by way of example, not by limitation. Thus, although the instrumentalities described herein are for the convenience of explanation shown and described with respect to exemplary embodiments, it will be appreciated that the principles herein may be equally applied in other types of light emitting devices.

Referring now to the drawings, FIGS. 2 through 18 conceptually illustrate a process of providing a low cost active matrix display. It will be appreciated that the described process need not be performed in the order in which it is herein described, but that this description is merely exemplary of one preferred process of fabricating low cost active matrix displays.

Figure 2:
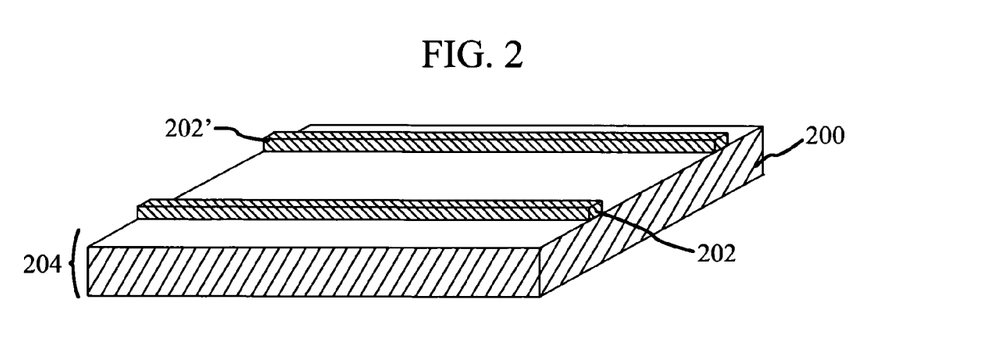
FIG. 2 is a perspective view of an embodiment illustrating first conductors provided upon a substrate.

As shown in FIG. 2, in at least one embodiment the fabrication process may be commenced upon a substrate 200. Typically, the substrate 200 is chemically cleaned to remove any particulate matter, organic, ionic and/or metallic impurities or debris which may be present upon the surface of the substrate 200.

So as to provide light to the liquid crystal device, in at least one embodiment, the substrate 200 is translucent. More specifically, in at least one embodiment, substrate 200 is substantially transparent. In an alternative embodiment, substrate 200 provides a plurality of embedded light sources such as, for example, light emitting diodes (not shown), on top of which elements of the display are established. In yet another alternative embodiment, substrate 200 is substantially opaque, the perceived illumination the result of light entering an LCD element being reflected back out.

In at least one embodiment, substrate 200 is flexible. Such a flexible substrate 200 may be plastic, foil, polymer or other appropriate material so as to permit the fabricated display to advantageously flex.

Figure 3:
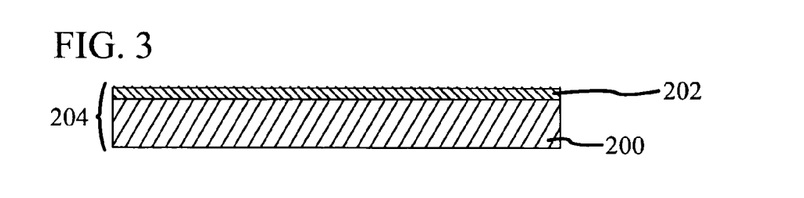
FIG. 3 is a plane view of the substrate shown in FIG. 2.

As shown in FIG. 2, at least one first electrical conductor, hereinafter referred to as first conductor 202, is provided upon the substrate 200. More specifically, in at least one embodiment a plurality of parallel first conductors 202, 202' are provided upon the substrate 200. The first conductor 202 may also be referred to as a word line. FIG. 3 provides a plane view of the substrate 200 shown in FIG. 1. The deposition of the first conductor(s) upon the substrate 200 yields a layered structure 204, upon which additional materials and operations are performed to transform layered structure 204 into the active matrix display 900 shown in FIGS. 17 and 18.

So as to advantageously reduce costs of production, eliminate the tooling precision required for repeated alignment of a photolithographic mask and improve the percentage of usable displays, the plurality of first conductors 202, 202' is provided by roll-to-roll processing, also referred to as web processing.

In roll-to-roll processing, the substrate 200 (and resulting layered structure 204) may be several meters wide and several meters long. In at least one embodiment, the first conductors 202 are established upon the substrate 200 by combining a conductive material with a fluid (such as ink) or powder (such as toner) medium. Utilizing the well understood methods of ink-jet printing, or laser printing, a conductive medium is applied to the substrate 200 in specific areas so as to provide first conductors 202, 202'. In other words, the first conductors 202 are provided upon the substrate 200 by printing.

In at least one embodiment, each first conductor 202, 202' is about 1 to 10 microns in width. The parallel first conductors 202, 202' are spaced about 10 to 200 microns apart from one another. By way of example, a high resolution display may feature 1000 display pixels per inch, or more. At this resolution, each pixel is approximately 25 microns on a side. Width and spacing of first conductors 202, 202' will typically be determined by the sizing of the display pixel desired to provide the desired display resolution. Such width and spacing is well within the tolerances of printing technology.

Figure 4:
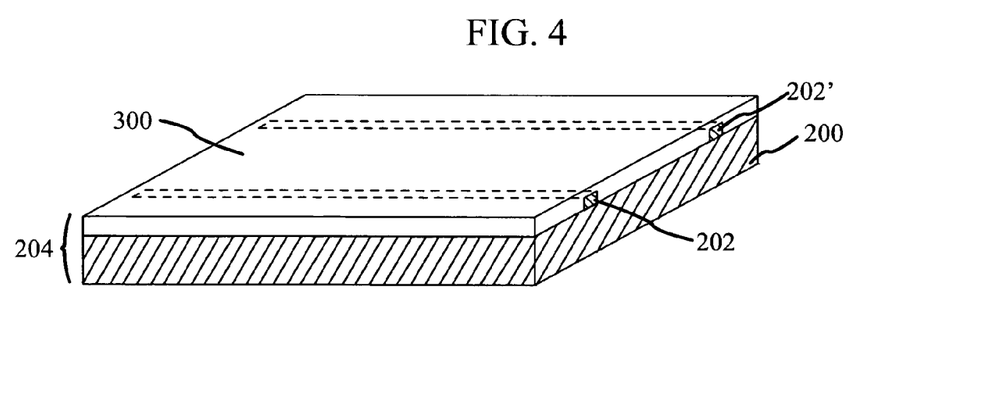
FIG. 4 is a perspective view of a dielectric gate deposited upon the substrate of FIG. 2.

As shown in FIG. 4, a gate dielectric 300 is deposited upon the substrate 200 and first conductors 202, 202' such that the top surfaces of the first conductors 202, 202' are entirely covered. The gate dielectric 300 may be deposited as a rolled sheet, sprayed or deposited by another such appropriate method.

Figure 5:
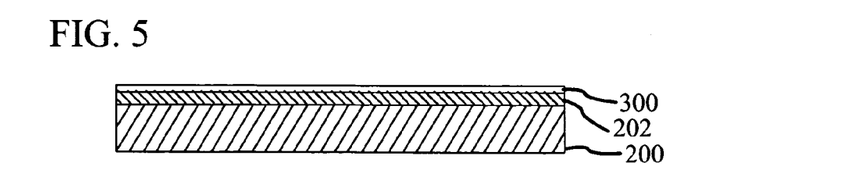
FIG. 5 is a plane view of the substrate shown in FIG. 4.

Under appropriate circumstances, a planarizing process may be performed to further insure a uniform layer of gate dielectric 300 on top of each first conductor 202, 202'. The gate dielectric 300 may be a common dielectric material such as, for example, silicon dioxide. The thickness of the gate dielectric 300 on top of each first conductor 202, 202' is selected to be thick enough to provide an insulation property, but thin enough to act as a gate in a field effect transistor (FET) to be established by the fabrication method. FIG. 5 is a plane view of the layered structure 204 in FIG. 4, further illustrating the uniform thickness of gate dielectric 300 upon first conductor 202.

Figure 6:
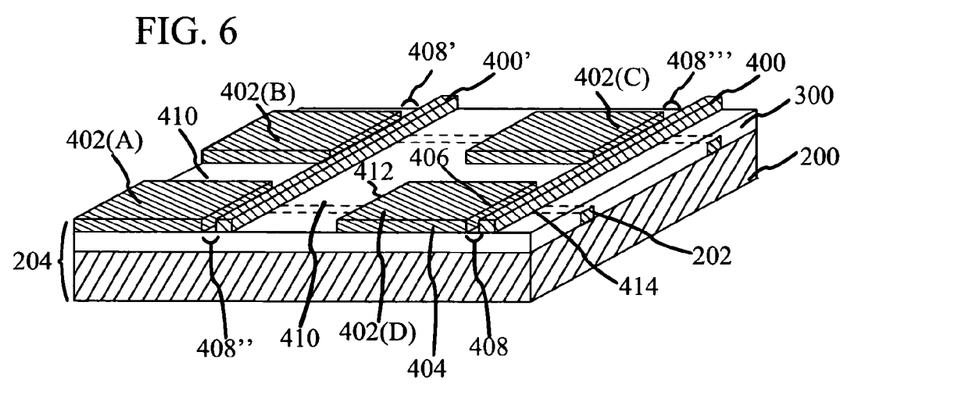
FIG. 6 is a perspective view of second conductors and pixel electrode provided upon the substrate shown in FIG. 4.

With a uniform gate dielectric 300 established upon the first conductors 202, 202', at least one second electrical conductor, hereinafter identified as second conductor 400, and at least one pixel electrode 402(A), 402(B), 402(C), 402(D) are provided upon the gate dielectric 300, as shown in FIG. 6. More specifically, in at least one embodiment, a plurality of parallel second conductors 400, 400' crossing the plurality of first conductors 202, 202' are provided upon the gate dielectric 300.

The second conductors 400, 400' crossing the first conductors 202, 202' provide a plurality of intersections, e.g. intersection 414 where first conductor 202 crosses second conductor 400. Each of the pixel electrodes 402(A) through 402(D) is disposed proximate to an intersection above one of the first conductors 202, 202'. For example, pixel electrode 402(D) is proximate intersection 414. Gate dielectric 300 separates the first conductors 202, 202' from the second conductors 400, 400'. The second conductors 400 may also be referred to as bit lines. The crossing relationship between the first conductors 202 and the second conductors 400 define the matrix properties of the eventual display, which may have any number of first conductors 202, 202'; second conductors 400, 400'; and pixel electrodes 402(A) to 402(D).

A plurality of pixel electrodes 402-402(D) are also provided upon the gate dielectric 300. Each pixel electrode 402(A)-402(D) is defined by a contiguous outer perimeter, such as outer perimeter 404 of pixel electrode 402(D). Each pixel electrode 402 is disposed such that a first portion 406 of outer perimeter 404 is adjacent to a second conductor 400 and defines a gap 408 between second conductor 400 and pixel electrode 402.

As shown in FIG. 6, the remaining portion 412 of the outer perimeter 404 of pixel electrode 402(D) is remote from other pixel electrodes 402(A), 402(B), 402(C) and second conductor 400'. In other words, each pixel electrode 402(A)-402(D) is paired with a second conductor 400, 400'. Each pairing defines a gap 408 between paired second conductor 400 and pixel electrode 402.

By way of example, each second conductor 400 may be about 1 to 5 microns in width. The parallel second conductors 400, 400' may be spaced about 10 to 200 microns apart from one another. The gap 408 between the paired second conductor 400 and pixel electrode 402 may be between about 0.1 and 2 microns. Gap 408 is generally described as being narrow. As noted above with respect to the first conductors 202, the size and spacing of the second conductors 400, 400' may be determined by the size of the display pixel that is desired to provide the desired display resolution.

As may be appreciated in FIG. 6, each second conductor 400, 400' may be paired with multiple pixel electrodes 402(A)-402(D). More specifically, pixel electrodes 402(A) and 402(B) are each paired with second conductor 400'. The pairing of pixel electrode 402(B) to second conductor 400' establishes gap 408'. Likewise the pairing of pixel element 402(A) to second conductor 400 establishes gap 408". Similarly, the paring of pixel element 402(C) to second conductor 400 establishes gap 408'''.

As a further result of the pairing, large surface areas 410 are defined between unpaired pixel electrodes 402 and second conductors 400. In other words, while a first portion 406 of the outer perimeter 404 defines narrow gap 408 proximate to conductor 400 and intersection 403, of pixel electrode 402(D), the remaining portion 412 of the outer perimeter 404 is remote from other pixel electrodes 402(A), 402(B) and 402(C), as well other second conductors 400' and associated intersections.

Figure 7:
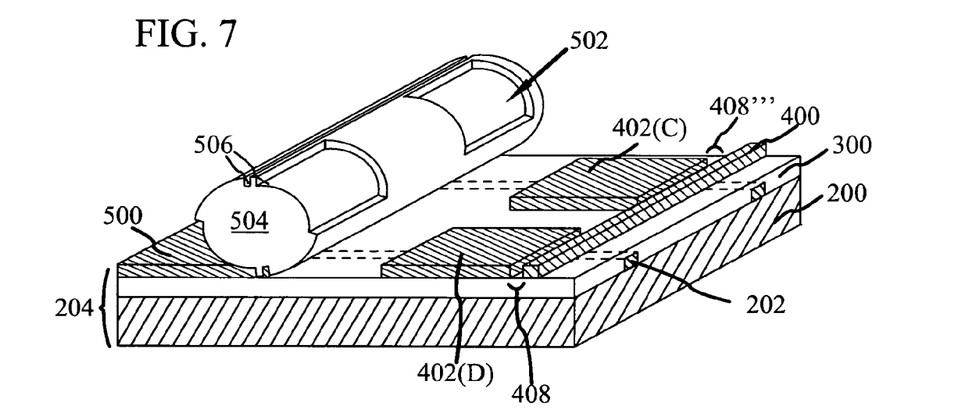
FIG. 7 is a perspective view of an embossing process embodiment.

In at least one embodiment of roll-to-roll production, providing the second conductors 400, 400' and the pixel electrodes 402(A)-402(D) is performed substantially contemporaneously. More specifically, the second conductors 400, 400' and the pixel electrodes 402(A)-402(D) are formed of the same material at substantially the same time. As such, and as is illustrated in FIG. 7, in at least one embodiment, a conductive material layer 500 is deposited upon the gate dielectric 300. An embosser 502 acts as a template press, defining the desired features—in this case the second conductors 400 and the pixel electrodes 402—within the deposited layer of conductive material 500, see FIG. 7.

Different embossing techniques are known and may be employed at the discretion of the technician as is suitable for establishing second conductors 400 and pixel electrodes 402(A)-402(D). In one embodiment, the embosser 502 utilizes a rolling embossing drum 504. The conductive material layer 500 may be applied as a rolled sheet or by sputtering, ion beam deposition, electron beam evaporation or other such appropriate method. Under appropriate circumstances, an additional layer of material (not shown), such as a resist layer, may also provided upon the conductive material layer 500 to assist with the embossing process, e.g. to help reduce stickiness between the conductive material layer 500 and the embossing drum 504.

As the embossing drum 504 passes across conductive material layer 500, the 3-D template pattern 506 upon the embossing drum 504 compresses portions of conductive material layer 500 and a resist layer (if provided), thereby defining the desired second conductors 400, 400', pixel electrodes 402(A)-402(D) and gaps 408, 408', 408".

As the embossing process may typically be characterized as compressing but not otherwise removing undesired material, an etching process is then performed. It is generally understood that an ion etching process may be accomplished by either of two processes: a physical process or an assisted physical process. In a physical etching environment, the removal of material is entirely dependent upon the physical impact of the ions knocking atoms off the material surface by physical force alone. Physical ion etching is commonly referred to as ion milling or ion beam etching.

As an alternative to physical etching, under appropriate circumstances, an assisted physical process such as reactive ion etching (known as RIE) may be employed. In an RIE process, removal of material results from a combination of chemical reactions and physical impact. Generally, the ions are accelerated by a voltage applied in a vacuum. The effect of their impact is aided by the introduction of a chemical that reacts with the surface being etched. The reaction makes the surface softer and as such, increases the etching rate. A chemically assisted physical etching process is also referred to as a wet etching process.

As some portions of conductive material layer 500 are thick while others are thin, etching for a predetermined period of time permits the removal of the thin portions while allowing the thicker portions to remain. Where a protective resist layer has been applied, the layered structure 204 is scrubbed or otherwise cleaned to remove the resist such that the desired second conductors 400, 400' and pixel electrodes 402(A)-402(D) are exposed.

A roll-to-roll printing process such as that used to provide the first conductors 202, 202' may be used to provide second conductors 400, 400' and pixel electrodes 402(A)-402(D). However, generally speaking, an embossing process is preferred, as current embossing techniques advantageously permit finer features than are likely to be established through a printing technique.

Figure 8:
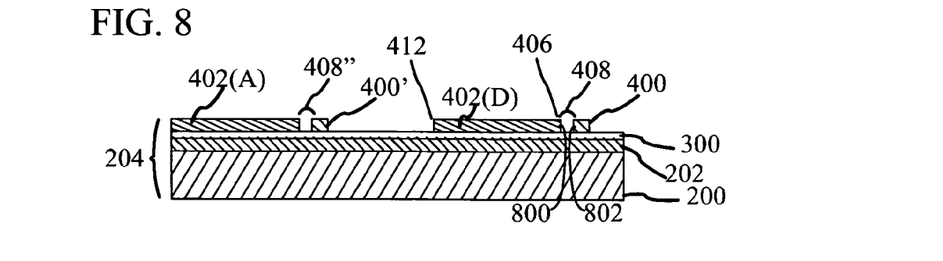
FIG. 8 is a plane view of the substrate shown in FIG. 6.

More specifically, the side walls 800, 802 defining each gap 408, 408', 408" are preferably substantially transverse to the surface of the substrate 200, and each gap 408 itself is quite narrow. The configuration of gap 408 may be more fully appreciated with respect to FIG. 8, showing a plane view of the layered structure 204 shown in FIG. 7. Such a substantially transverse orientation of side walls 800, 802 and narrow feature of gap 408 is more easily obtained with present technology by embossing.

Figure 9:
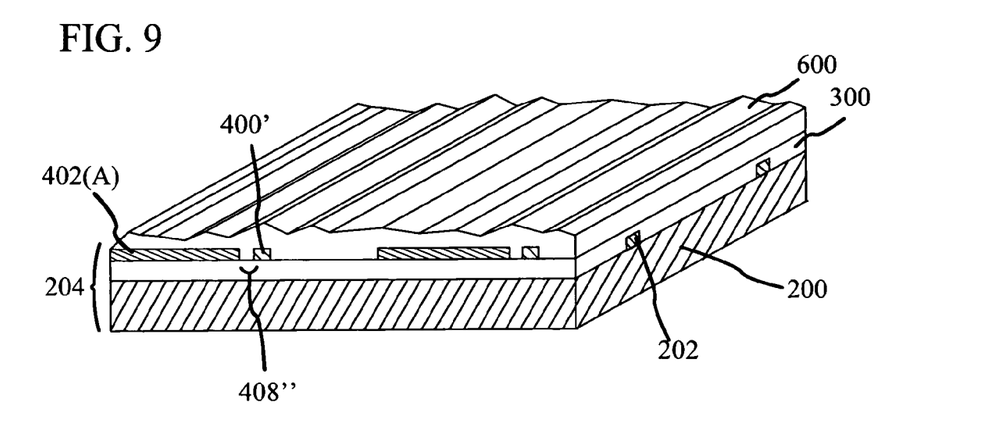
FIG. 9 is a perspective view of a semiconductor material deposited upon the substrate of FIG. 6.
Figure 10:
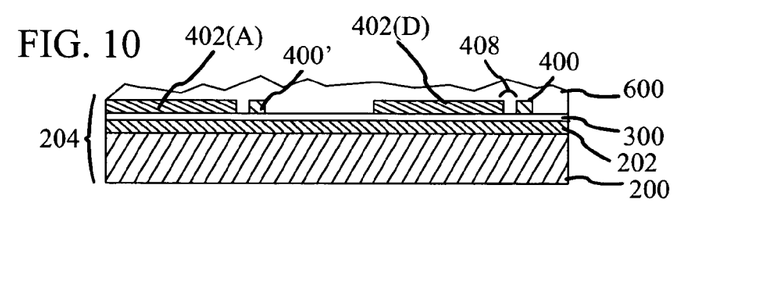
FIG. 10 is a plane view illustrating the exaggerated nature of FIG. 9.

With second conductors 400, 400' and pixel electrodes 402(A)-400(D) thus provided, a semiconductor material 600 is provided covering gate dielectric 300 and conductive elements provided thereon, as shown in FIG. 9 and FIG. 10. More specifically, semiconductor material 600 is deposited over second conductors 400, 400', and pixel electrodes 402(A)-400(D), and within each gap 408, 408', 408", 408'". More specifically, and by way of example, gap 408 may be filled with semiconductor material 600 and shelter at least a portion of the semiconductor material 600.

More specifically, as described above, the side walls 800, 802 of gap 408 are substantially transverse and gap 408 is quite narrow. In at least one embodiment, the depth of gap 408 (i.e. the height of second conductor 400 and pixel electrode 402(A)) as defined by sidewalls 800, 802 may be greater than the width of the gap 408. This physical configuration of gap 408 shelters a portion of the semiconductor material 600 that is contained within gap 408. In contrast, the semiconductor material 600 deposited elsewhere upon gate dielectric 300 of layered structure 204 is unsheltered.

Figure 11:
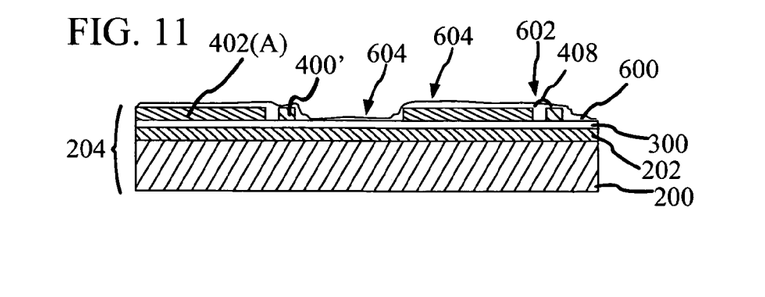
FIG. 11 is a plane view illustrating a less exaggerated depiction of the semiconductor material deposited upon the substrate of FIG. 6.

The layer of semiconductor material 600 shown in FIGS. 9 and 10 is exaggerated in scale for illustrative purposes. FIG. 11 is presented to illustrate more closely how the layer of semiconductor material 600 may actually appear in scale. Specifically, in at least one embodiment, the semiconductor material 600 develops a depth 602 within each of gaps 408, 408', 408", 400'" that is greater than the depth 604 of the semiconductor material 600 elsewhere on the layered structure 204.

Figure 12:
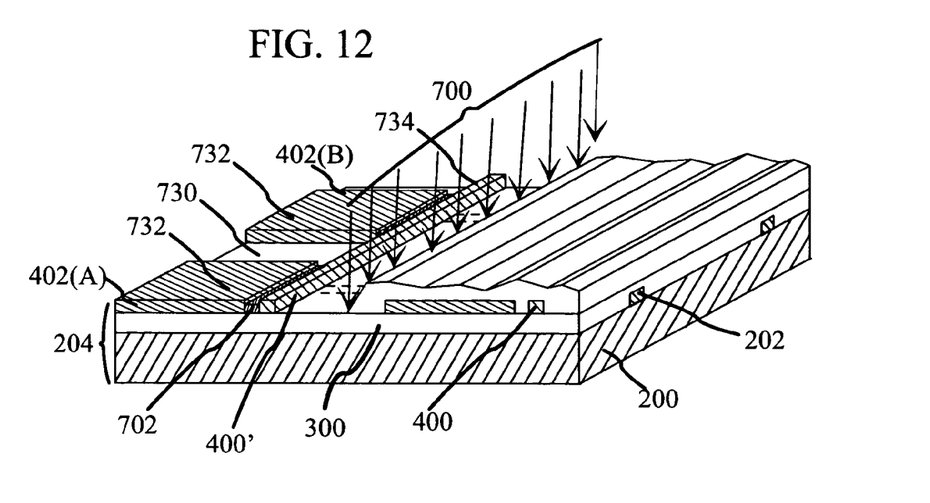
FIG. 12 is a perspective view of the substrate shown in FIG. 6 showing the removal of unsheltered semiconductor material.

As shown in FIG. 12, the unsheltered semiconductor material 600 is substantially removed from gate dielectric 300 of layered structure 204. More specifically, an ion etch process, such as an isotropic etching process, is performed upon layered structure 204 to remove substantially all of the unsheltered semiconductor material 600. As shown in FIG. 12, an ion beam 700, represented as arrows, is presented to layered structure 204.

By controlling the duration of exposure to ion beam 700, the unsheltered semiconductor material 600 is removed while the sheltered semiconductor material 600 within gaps 408, 408', 408", 400'" remains as a semiconductor bridges 702, 702', 702", 702'". By this etching process, the semiconductor material 600 is removed from the large surface areas 730, the top surfaces 732 of pixel electrodes 402 and the top surfaces 734 of second conductors 400. In at least one embodiment, the etching of the semiconductor material 600 is performed with a wet etching process.

Desired electrical properties of the semiconductor bridge 702 are achieved by selecting appropriate semiconductor material 600, also commonly referred to as semiconducting material. In one embodiment, semiconductor material 600 is deposited and the electrical properties of semiconductor material 600 are locally modified forming, in essence, an enhancement mode field effect transistor (no conduction when gate voltage is off) with the gate region located with the semiconductor bridge area 702. In at least one embodiment the semiconductor material 600 is relatively high quality semiconductor sufficient to fabricate a device that behaves like a transistor.

Figure 13:
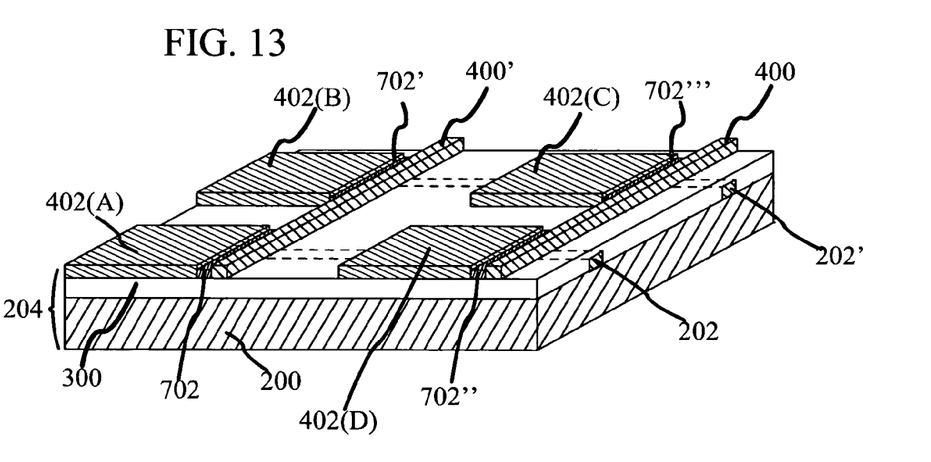
FIG. 13 is a perspective view illustrating the remaining bridges of substrate material following the removal process of FIG. 12.
Figure 14:
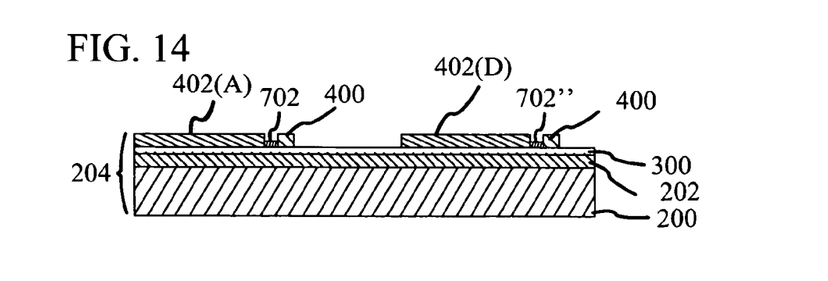
FIG. 14 is a plane view of the substrate shown in FIG. 13.

FIG. 13 illustrates layered structure 204 with the unsheltered semiconductor material 600 substantially removed from gate dielectric 300. FIG. 14 provides a plane view of the layered structure 204 shown in FIG. 13. Semiconductor bridges 702, 702', 702", 702'" act as an insulator when no bias field is applied. However, when a field is applied across semiconductor bridge 702, the insulator properties will change and a charge will flow. In other words, semiconductor bridges 702, 702', 702", 702'" are each channel regions of an field effect transistor. First conductors 202, 202' serve as a gate electrode. In one embodiment, second conductor 400 serves as a source electrode, and pixel electrode 402 serves as a drain electrode. In an alternative embodiment, the second conductor 400 is the drain and the pixel electrode 402 is the source.

In operation of pixel electrode 402(D), first conductor 202 provides a gate control potential by applying a field through gate dielectric 300. The threshold of the gate control potential is a characteristic of the transistor formed. More specifically, is thin enough to permit the influence of a gate control potential from first conductor 202, without electrically shorting first conductor 202 and second conductor 400. When the threshold of the semiconductor bridge 702" is exceeded, a charge is permitted to flow between the second conductor 400 and paired pixel electrode 402(D) through the semiconductor bridge 702". When a gate control potential is provided by first conductor 202 such that semiconductor bridge 702" is activated as a channel, pixel electrode 402(D) may be charged by applying a high potential to second conductor 400, or discharged by applying a low potential to second conductor 400.

The cross-point arrangement of the first conductors 202 with respect to the second conductors 400 permits specific selection of a specific pixel electrode 402 to be charged. More specifically, applying a voltage potential to first conductor 202 and a voltage potential to second conductor 400 will select pixel electrode 402(D) by inducing semiconductor bridge 702'" to act as a conducting channel.

As shown in the illustrations, each pixel electrode 402 and semiconductor bridge 702 is substantially centered above a corresponding first conductor 202. This depiction is for illustrative purposes only. No specific centering alignment is required. So long as some portion of the semiconductor bridge 702 is directly in line with a first conductor 202, the advantageous field effect transistor provided will function. As a result, this fabrication method is additionally advantageous as the degree of precision of alignment is substantially reduced. It is further understood and appreciated that the relative scale of the first conductors 202, second conductors 400 and pixel electrodes 402 is not correct, but has been employed in the illustrations for ease of discussion.

Under appropriate circumstances, such as when pixel electrodes 402(A)-402(D) are intended to reflect light back through the nematic liquid crystal material, the pixel electrodes 402(A)-402(D) may be polished and/or a reflective coating, such as silver, may be deposited upon the pixel electrodes 402(A)-402(D).

Figure 15:
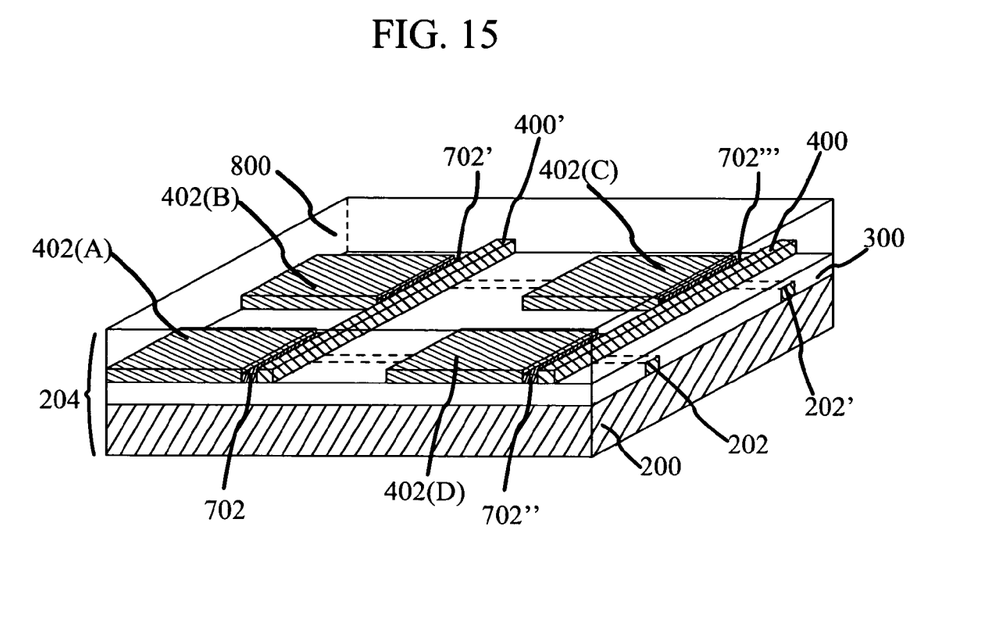
FIG. 15 is a perspective view of a liquid crystal layer deposited upon the substrate shown in FIG. 13.
Figure 16:
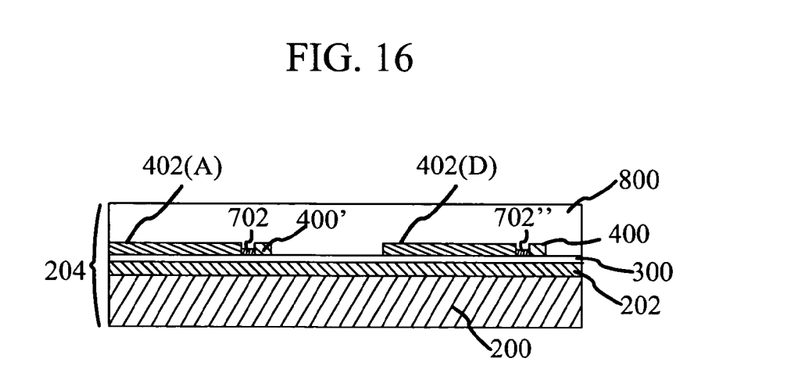
FIG. 16 is a plane view of the substrate shown in FIG. 15.

In one embodiment as is illustrated in FIGS. 15 and 16, a nematic liquid crystal layer 800 is then deposited upon the layered structure 204 as shown in FIG. 8. As is typically understood with respect to nematic liquid crystal, the operation of a nematic liquid crystal device involves polarization and the ability of the nematic liquid crystal to twist or untwist in the presence or absence of an electric field.

Figure 17:
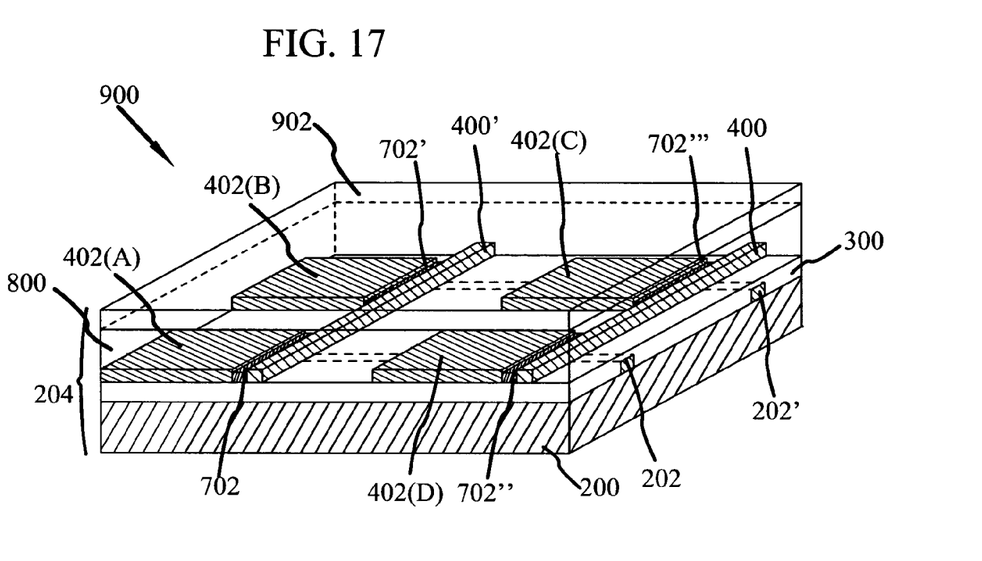
FIG. 17 is a perspective view of a translucent conductor deposited upon the substrate shown in FIG. 15.
Figure 18:
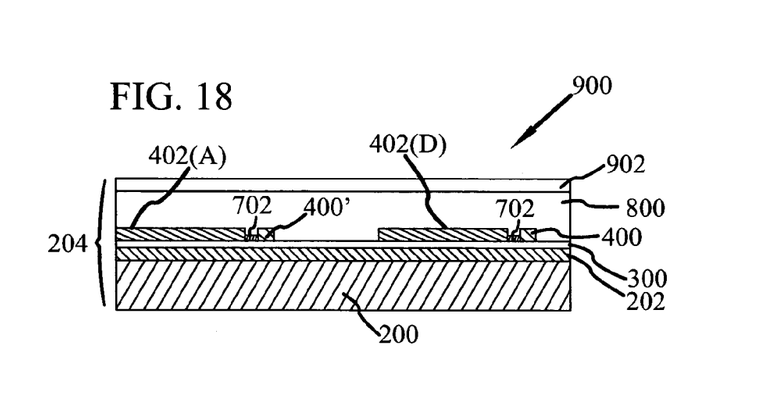
FIG. 18 is a perspective view of the fabricated active matrix display shown in FIG. 17.

To achieve the active matrix display 900, and complete the base components of electrodes on either side of the liquid crystal layer 800 to establish a control field, a translucent top conductor 902 is deposited upon the nematic liquid crystal layer 800, see FIGS. 17 and 18. Each pixel electrode 402 acts as an individual capacitor, developing a charge and establishing a field through the nematic liquid crystal layer 800 to translucent top conductor 902. In at least one embodiment, the translucent top conductor 902 is substantially transparent. A polarized film may be included between nematic liquid crystal layer 800 and translucent top conductor 902, or applied on top of transparent top conductor 902. In an alternative embodiment, polarization lines may be provided as part of the translucent top conductor 902.

To complete the general fabrication process of an active matrix display, power and control circuitry devices (not shown) are typically attached to the plurality of first conductors 202, 202' and second conductors 400, 400' at the periphery of the substrate 200. A visual mask may be added as well, so that an observing user is presented with substantially only the intended visual image-providing area of the active matrix display 900.

The above method advantageously provides a low cost active matrix display 900 having a plurality of parallel electrically conductive first conductors 202, 202' and a plurality of parallel electrically conductive second conductors 400, 400', crossing the first conductors 202, 202', the first and second conductors thereby forming a matrix with a plurality of intersections. A gate dielectric 300 disposed between the first conductors 202, 202' and the second conductors 400, 400'. A plurality of pixel electrodes 402(A)-402(D) are disposed upon the gate dielectric 300, each disposed proximate to an intersection and paired to a second conductor 400, 400'.

A semiconductor bridge 702 couples between each paired second conductor 400 and pixel electrode 402 in a narrow gap 408 (see FIGS. 6-8). At least a portion of semiconductor bridge 702 overlaps the first conductor 202 intersecting below the paired second conductor 400. Liquid crystals 800 are disposed upon each pixel electrode 402(A)-402(D), and a translucent conductor 900 is disposed upon the liquid crystals 800.

The first conductors 202, 202', second conductors 400, 400', pixel electrodes 402(A)-402(D), and semiconductor bridges 702, 702', 270", 702''' advantageously provide lax aligned field effect transistors for controlling the liquid crystals 800. Such lax alignment permits roll-to-roll fabrication techniques which advantageously reduce costs.

Changes may be made in the above methods, systems and structures without departing from the scope thereof. It should thus be noted that the matter contained in the above description and/or shown in the accompanying drawings should be interpreted as illustrative and not in a limiting sense. The following claims address all generic and specific features described herein, as well as all statements of the scope of the present method, system and structure, which, as a matter of language, might be said to fall therebetween.

We claim:

1. A method of making an active matrix display, comprising:
   providing at least one first conductor upon a substrate;
   depositing a gate dielectric upon the first conductor;
   providing at least one paired second conductor and at least one pixel electrode upon the gate dielectric, a narrow gap being established between the second conductor and the pixel electrode;
   depositing a semiconductor material over the at least one paired second conductor and pixel electrode and within the narrow gap, the narrow gap sheltering at least a portion of the semiconductor material to provide sheltered semiconductor material deposit in the narrow gap;
   removing unsheltered semiconductor material;
   depositing a liquid crystal display layer upon the paired second conductor, the pixel electrode and the sheltered semiconductor material;
   depositing a translucent conductor upon the liquid crystal display layer.

2. The method of claim 1, wherein the pixel electrode is disposed above the first conductor.

3. The method of claim 1, wherein at least a portion of the sheltered semiconductor material overlaps the first conductor.

4. The method of claim 3, wherein the sheltered semiconductor material over the first conductor forms a channel region of a field effect transistor.

5. The method of claim 1, wherein the removal of the unsheltered semiconductor material is performed by ion etching.

6. The method of claim 1, wherein the removal of the unsheltered semiconductor material is performed by wet etching.

7. The method of claim 1, further including planarizing the gate dielectric to a uniform thickness over the at least one first conductor.

8. The method of claim 1, wherein providing the at least one first conductor is accomplished with roll-to-roll processing.

9. The method of claim 1, wherein providing the at least one second conductor and the pixel electrode further includes:
   depositing a layer of conductive material upon the gate dielectric;
   embossing the layer of conductive material to define the second conductor and pixel electrode.

10. The method of claim 1, wherein the translucent conductor is transparent.

11. The method of claim 1, wherein each at least one second conductor is transverse to each at least one first conductor.

12. The method of claim 1, wherein the substrate is flexible.

13. A method of making an active matrix display, comprising:
   providing a plurality of parallel first conductors upon a substrate;
   depositing a gate dielectric upon the first conductor;
   providing a plurality of parallel second conductors and pixel electrodes upon the gate dielectric, the second conductors crossing the first conductors, each pixel electrode paired to a second conductor, each pairing defining a narrow gap between the paired second conductor and pixel electrode, each pairing further defining large surface areas between unpaired pixel elements and second conductors;
   depositing a semiconductor material over the paired second conductors, pixel electrodes and surface areas and within the narrow gaps, each narrow gap sheltering at least a portion of the semiconductor material to provide sheltered semiconductor material;
   removing semiconductor material from the large surface areas and a top surface of the paired second conductors and pixel elements;

depositing a liquid crystal display layer upon the paired second conductor, pixel electrode and sheltered semiconductor material;
depositing a translucent conductor upon the liquid crystal display layer.

14. The method of claim 13, wherein each second conductor is paired with multiple pixel elements.

15. The method of claim 13, wherein providing the parallel first conductors is performed with roll-to-roll printing.

16. The method of claim 13, wherein providing the parallel second conductors and pixel electrodes is performed with roll-to-roll printing.

17. The method of claim 16, wherein providing the parallel second conductors and pixel electrodes further includes embossing.

18. The method of claim 13, wherein the second conductors crossing the first conductors provides a plurality of intersections, each pixel electrode disposed proximate to an intersection above a first conductor, at least a portion of the sheltered semiconductor material overlapping the first conductor.

19. The method of claim 18, wherein the sheltered semiconductor material over the first conductor forms a channel region of a field effect transistor.

20. The method of claim 13, wherein removal of the unsheltered semiconductor material is performed by ion etching.

21. The method of claim 13, wherein removal of the unsheltered semiconductor material is performed by wet etching.

22. The method of claim 13, further including planarizing the gate dielectric to a uniform thickness over each first conductor.

23. The method of claim 13, wherein the substrate is flexible.

24. A method of making an active matrix display, comprising:
providing a plurality of parallel first conductors upon a substrate;
depositing a gate dielectric upon the first conductor;
providing a plurality of parallel second conductors upon the gate dielectric, the second conductors crossing the first conductors;
providing a plurality of pixel electrodes upon the gate dielectric, each pixel electrode defined by a contiguous outer perimeter, each pixel electrode disposed such that a first portion of the outer perimeter is adjacent to a second conductor and defines a narrow gap between the second conductor and the pixel electrode, the remaining portion of the outer perimeter being remote from other pixel electrodes and second conductors;
depositing a semiconductor material over the second conductors and the pixel electrodes and the within each narrow gap, each narrow gap sheltering at least a portion of the semiconductor material to provide sheltered semiconductor material;
removing semiconductor material from the large surface areas and a top surface of the paired second conductors and pixel elements;
depositing a liquid crystal display layer upon the paired second conductor, pixel electrode and the sheltered semiconductor material;
depositing a translucent conductor upon the liquid crystal display layer.

25. The method of claim 24, wherein the second conductors crossing the first conductors provides a plurality of intersections, each pixel electrode disposed proximate to an intersection above a first conductor, at least a portion of the sheltered semiconductor material overlapping the first conductor.

26. The method of claim 25, wherein the sheltered semiconductor material over the first conductor forms a channel region of a field effect transistor.

27. The method of claim 24, wherein the removal of the unsheltered semiconductor material is performed by ion etching.

28. The method of claim 24, wherein the removal of the unsheltered semiconductor material is performed by wet etching.

29. The method of claim 24, further including planarizing the gate dielectric to a uniform thickness over the first conductors.

30. The method of claim 24, wherein providing the parallel first conductors is accomplished with roll-to-roll processing.

31. The method of claim 24, wherein providing the parallel first conductors is performed with roll-to-roll printing.

32. The method of claim 24, wherein providing the parallel second conductors and providing the pixel electrodes is performed contemporaneously.

33. The method of claim 32, wherein providing the parallel second conductors and the pixel electrodes further includes:
depositing a layer of conductive material upon the gate dielectric;
embossing the layer of conductive material to define the parallel second conductors and pixel electrodes.

34. The method of claim 24, wherein each pixel electrode is substantially rectangular.

* * * * *